United States Patent [19]

Klingebiel

[11] 4,014,524
[45] Mar. 29, 1977

[54] DISPERSING APPARATUS

[75] Inventor: Ward John Klingebiel, Charleston, W. Va.

[73] Assignee: Union Carbide Corporation, New York, N.Y.

[22] Filed: Nov. 19, 1975

[21] Appl. No.: 633,361

Related U.S. Application Data

[60] Continuation-in-part of Ser. No. 487,250, July 10, 1974, abandoned, which is a division of Ser. No. 42,316, June 1, 1970, abandoned, which is a continuation-in-part of Ser. No. 704,639, Feb. 12, 1968, abandoned.

[52] U.S. Cl. .................................... 259/6; 259/7
[51] Int. Cl.² .................. B01F 7/26; B01F 13/10
[58] Field of Search .............. 259/6, 7, 8, DIG. 30; 241/46.17

[56] References Cited

UNITED STATES PATENTS 1,993,446  3/1935  Huff ................................. 259/7 X
2,705,131  3/1955  Ross et al. ................. 259/DIG. 30

Primary Examiner—Philip R. Coe
Attorney, Agent, or Firm—Gerald R. O'Brien

[57] ABSTRACT

Apparatus is disclosed for dispersing a low viscosity fluid throughout a high viscosity polymer-containing mass comprising: conveying means for continuously passing a gross pre-mixture of said mass and said fluid through mixer means having a cylindrical barrel and a plurality of spaced, commonly-rotatable dispersion discs positioned therein as alternately-spaced perforated and solid rotating discs; said plurality of perforated and solid discs being arranged so that the first and last discs are perforated.

4 Claims, 4 Drawing Figures

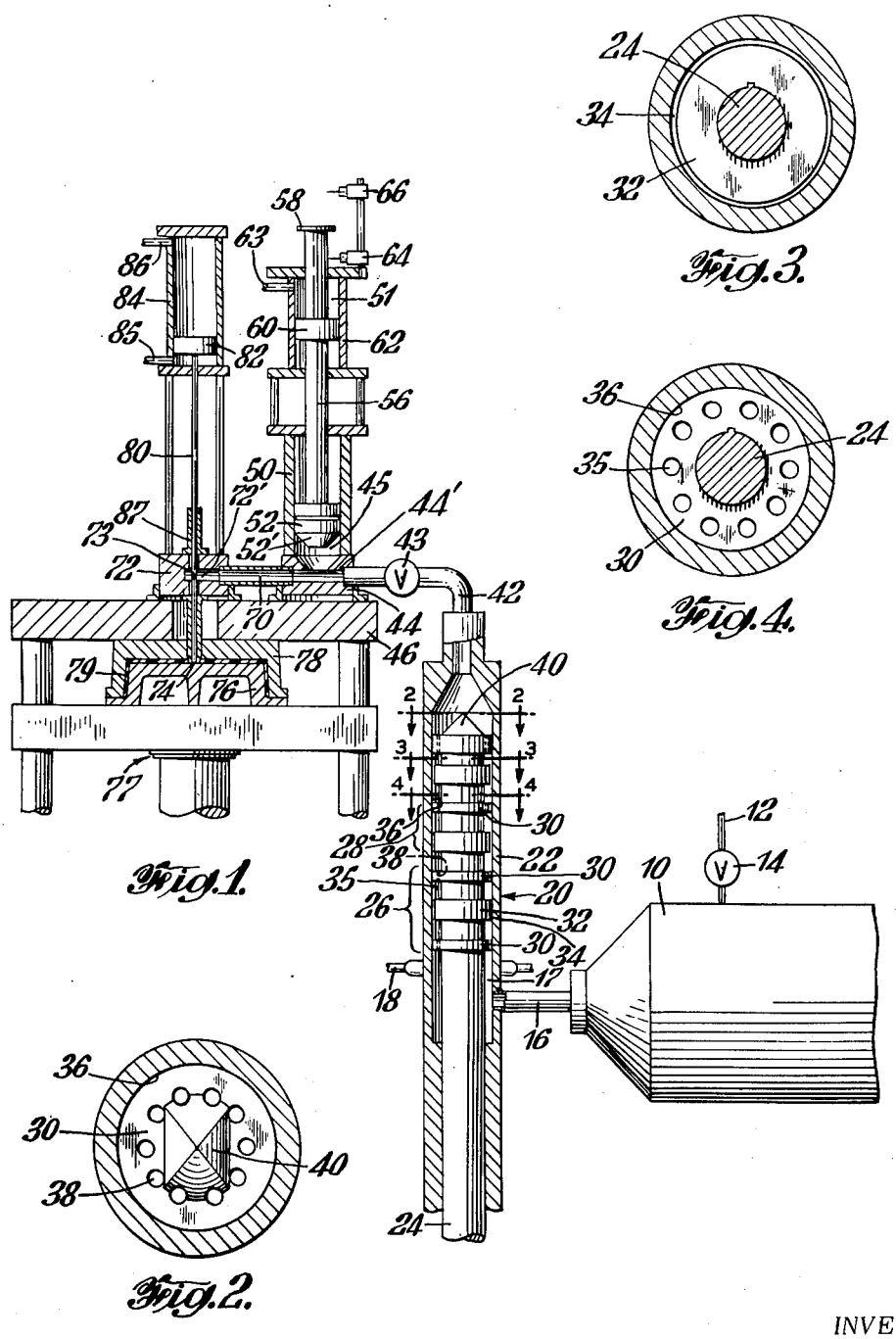

DISPERSING APPARATUS

This is a continuation-in-part of my earlier application Ser. No. 487,250 filed July 10, 1974 abandoned which is a division of my earlier application Ser. No. 42,316, filed June 1, 1970, abandoned which is, in turn, a continuation-in-part of my original application Ser. No. 704,639 filed Feb. 12, 1968, all of such prior applications now being abandoned.

This invention relates to apparatus for dispersing a low viscosity fluid throughout a high viscosity polymer or polymer solution mass.

Heretofore, it has often been desirable to randomly disperse a low viscosity fluid throughout a high viscosity polymer or polymer solution. It has been found that such dispersion problem is difficult even if the low viscosity fluid and the high viscosity polymer or polymer solution are previously considered to be miscible. Some combinations of low viscosity fluids and high viscosity polymer or polymer solution have been considered to be immiscible.

The prior art has recognized not only the relatively low shear mixing of such low viscosity fluids and high viscosity polymers or polymer solutions but also the employment of high shear mixing in order to effect dispersion. However, the difficulty in uniformly obtaining intimate mixtures or dispersions of such fluids and polymers or polymer solutions as well as the generally recognized immiscibility of certain combinations has long presented the need for improved mixing or dispersing apparatus.

Accordingly, it is the prime object of the present invention to provide apparatus for the mixing or dispersion of low viscosity fluids in high viscosity polymers or polymer solutions yielding an improved and more intimate dispersion.

Other aims and advantages of the invention will be apparent from the following description and appended claims.

As employed herein, the following terms are understood to have the following meanings: "Polymer-containing mass" means any synthetic organic thermoplastic mass or solution thereof which is flowable under the temperature and pressure conditions employed in the mixing apparatus of the present invention, such mass or solution being stable above its softening point under the conditions of mixing.

"High viscosity" is understood to mean a viscosity greater than about 1000 centipoises.

"Low viscosity" is understood to mean a viscosity in the range from about 0.01 centipoises to about several centipoises, it being understood that the ratio of viscosity of the high viscosity polymer-containing mass to that of the low viscosity fluid is 1000:1 or higher.

"Intimate dispersion" is understood to mean that the low viscosity fluid phase of the dispersion contains particles of the order of about 10–100 microns in size.

"Low shear mixing zone" is understood to mean a mixing zone in which shear gradients are not sufficiently intense to exceed the characteristic relaxation rate of the mass being mixed. Such low shear mixing zone may be defined, for the case of the dispersion of water in a polystyrene solution mass for the purpose of devolatilization aid, as a shear rate of the order of magnitude of about 10 sec.$^{-1}$.

"High shear mixing zone" is understood to mean the mixing zone in which shear gradients are sufficiently intense to further subdivide and reduce the randomly-distributed low viscosity fluid regions (bubbles) dispersed in the high viscosity polymer or polymer solution in size to provide a finer dispersion. Such shear rates, in the case of the dispersion of water in a polystyrene solution mass to act as a devolatilization aid, are of the order of magnitude of about 100 sec.$^{-1}$.

"Low viscosity fluid regions" or "bubbles" is understood to mean the distributed gaseous or liquid phase dispersed in the high viscosity polymer-containing mass.

"Intense shear mixing zone" is understood to mean a mixing zone in which the shear gradients are sufficiently intense to exceed the characteristic relaxation rate of the polymer-containing mass being mixed. Such shear rates, for the case of the dispersion of water in a polystyrene solution mass as a devolatilization aid, are of the order of magnitude of about 1000 sec.$^{-1}$.

It should be noted that, whereas the shear rates indicated with respect to the dispersion of water in polystyrene present a ratio of approximately 10:100:1000 for low, high, and intense shear mixing zones, these shear rate ratios will be found to vary based on the low viscosity fluid and high viscosity polymer or polymer solution to be mixed, However, whereas the value of shear rates obtained in each of the low, high, and intense shear mixing zones will vary depending upon the selection of low viscosity fluid and polymer or polymer solution mass, the ratio of the shear rates for these mixing zones will follow essentially the approximately 10:100:1000 ratio obtained in the case of the dispersion of water in polystyrene solution mass, which is set forth by way of example.

SUMMARY

In accordance with the present invention, apparatus is provided for dispersing a low viscosity fluid throughout a high viscosity polymer-containing mass comprising: conveying means for continuously passing a gross pre-mixture of said high viscosity polymer-containing mass and said low viscosity fluid in simultaneous co-current flow to and in a single direction through mixer means having a cylindrical barrel and a plurality of spaced, commonly-rotatable dispersion discs positioned therein as alternately-spaced perforated and solid rotating discs; said perforated discs providing first mixing zones through their perforations and having outer edge surfaces in close rotating clearance with the inner walls of said barrel; said solid rotating discs having their outer edge surfaces spaced from the inner walls of said barrel to there form second mixing zones wherein said fluid is mixed after passage through said first mixing zones and is intimately dispersed throughout the polymer-containing mass when passed through said second mixing zones; said plurality of perforated and solid discs being arranged so that the first and last discs are perforated.

It is important that the intimate dispersion produced by the mixing apparatus of the present invention be properly handled, subsequent to its formation, in order to prevent coalescence of the low viscosity fluid phase of the intimate dispersion. This may be accomplished in a number of ways so as to randomize and make more homogeneous the entire dispersion and re-direct its flow so as to prevent coalescence.

Prior to introduction into the apparatus of the invention gross pre-mixing is first effected in a first low shear mixing zone as by the injection of the low viscosity fluid as bubbles into the high viscosity flowable polymer-containing mass. A second zone of high mechanical shear is provided (which comprises the perforations of aperture means of a perforated spinning disc) to effect a subdivision of the low viscosity fluid bubbles in the polymer-containing mass, thereby forming a dispersion. The third mixing zone provided is a mixing region characterized by viscoelastic secondary flow patterns which direct the dispersion mass toward a region of intense shear gradients. The fourth mixing zone of intense shear gradient causes the characteristic relaxation rate of the polymer-containing mass to be exceeded and to thereby effect multiple fracture (melt fracture) of the mass and produce an intimate dispersion of the low viscosity fluid in the high viscosity mass. It is understood that the fracture or subdivision of the polymer-containing mass in this zone is such that the mass is subdivided and the low viscosity fluid bubbles fill the voids caused by the subdivision of the mass. This results in the production of a very intimate dispersion which may then be randomized and redirected in flow in a succeeding fifth low shear mixing zone. The intimately dispersed mass is then forced through a sixth mixing zone of high mechanical shear (which again comprises the perforations or aperture means of a rotating perforated spinning disc). The passage of the intimately dispersed mass through these last two zones of low shear (simple) mixing and high mechanical shear mixing causes a redirection of flow of the mass, thereby preventing coalescence of the dispersion mass, i.e., return to a less finely divided dispersion.

The present invention will become readily apparent from the following description taken in conjunction with the appended drawing wherein:

DRAWING

FIG. 1 is a partly broken away side elevational view of a spinning disc disperser of the invention employed in connection with extruder and accumulator for the production of foamed thermoplastic articles.

FIG. 2 is a cross-sectional view of the spinning disc disperser of the invention taken along line 2—2 of FIG. 1.

FIG. 3 is a cross-sectional view of the spinning disc disperser of the invention taken along line 3—3 of FIG. 1.

FIG. 4 is a cross-sectional view of the spinning disc disperser of the invention taken along line 4—4 of FIG. 1.

DESCRIPTION

The apparatus of the invention is specially suited for application in combination with an extruder and accumulator in molding foamed thermoplastic articles characterized by a cellular core and a substantially noncellular integral peripheral shell, such as disclosed in U.S. Pat. Nos. 3,268,636 and 3,436,446. While the present invention finds particular utility in such application (which is disclosed and claimed in my copending patent application entitled "Apparatus for Forming Thermoplastic Articles" filed July 10, 1974) the spinning disc disperser of the present invention can also be advantageously employed in almost any operation requiring the dispersion of a fluid throughout a polymer or polymer solution mass such as when the ratio of the viscosity of the high viscosity polymer or polymer solution to that of the low viscosity fluid is greater than 1,000.

More particularly, this disperser has utility in itself in such applications as in the addition of a devolatilization aid to various polymeric materials and especially when the fluid to be dispersed is immiscible in the polymer, or in the addition of additives such as plasticizers, colorants, or particular solids to polymer or polymer solution masses.

An embodiment of the apparatus of the invention which is especially suited for use in the molding of foamed thermoplastic articles characterized by a cellular core and a substantially noncellular, integral peripheral shell is illustrated in FIG. 1. As there shown, an extruder 10 is provided having attached thereto a line 12 for feeding a liquid or compressed gas blowing agent directly into the barrel of the extruder, if desired. A valve 14 is provided on line 12 to control the feeding. Line 16 connects the extruder 10 to the cylindrical barrel 22 of the spinning disc disperser 20 and line 18 feeds the low viscosity fluid into the annular chamber between a rotating shaft 24 and the cylindrical barrel 22 of the disperser 20. The rotating shaft 24 is located coaxially within the stationary, preferably smooth walled barrel 22 and comprises at least one spinning or rotating disc dispersion unit 26 comprising an alternating series of perforated 30 — solid 32 — perforated 30 discs. The head 40 of the shaft is preferably tapered to about 45° to minimize coalescense of the mixture at that point.

The outer surfaces of the discs are spaced from the inner wall of the stationary cylindrical barrel in such a manner than an intense shear region 34 is formed in the space between the outer edge of the solid disc 32 and the inner wall of the barrel 22 and close sliding contact 36 is provided between the perforated discs 30 and the inner wall of the barrel 22. The perforated discs 30 have several axially oriented apertures 38 located preferably in close proximity to the shaft surface. The number of apertures 38 in the perforated discs 30 depend upon the polymer-containing mass being processed. Normally, the perforated discs have from 4 to 24 apertures located around the disc surface.

Although, in accordance with the invention only one disc dispersion unit is required, when working with certain high viscosity polymers or polymer solutions, it may be preferable that the shaft 24 have two or three disc dispersion units. As illustrated in FIG. 1, each additional disc dispersion unit 28 other than the first unit 26 comprises only a solid 32 and perforated discs 30. When additional units are employed, they are positioned in such a manner on the shaft that the first disc and the last disc are perforated and the continuity of perforated-solid-perforated is maintained.

As employed herein, the terms "units", "sets", "series" and the like are understood to refer to this grouping of three dispersion discs in which the first and last of the alternately-spaced perforated and solid discs are perforated.

Accordingly, a plurality of alternately-spaced perforated and solid discs would constitute at least one such unit of three discs in number or any greater number of discs of the 5, 7, 9, 11, 13, etc. series.

It is preferred that the discs be spaced either approximately one-half to one inner barrel radius apart or such that the axial separation between the discs approximately equals the shortest distance from the cylindrical barrel to the shaft surface to optimize viscoelastic polymer mixing. The thickness of the perforated disc is not critical. However, the solid disc should have a thickness from about ¼th to 1/24th the diameter of the barrel, and preferably from ⅛ to 1/12 the diameter of the barrel. Although the exactness of these dimensions is not absolutely critical, it has been found that if the solid discs are too thin, there is slippage of the low viscosity phase past the disc without efficient dispersion.

The disc dispersion units may be formed as an integral part of the shaft or they may be mounted thereon as so to be commonly-rotatable. It is understood that, to meet the different requirements of the various materials which could be processed, the widths of the shearing regions, the thickness of the solid discs and the number of disc dispersion units may be varied as desired by having interchangeable shafts and/or disc dispersion units depending on whether the disc dispersion units 26 and 28 are mounted or an integral part of the shaft 24.

Extending from the head 40 of the disperser is a line 42 having a surge valve 43 thereon and connecting the disperser 20 to the internal conduit 44' of a base member 44 which is shown resting on a support member 46. Extending upward from the base member 44 is an accumulator device which includes a cylinder 50 and a piston 52 reciprocally movable therein. The piston 52 is shown having a frustoconical head 52' and a conventional O-ring 54 positioned around the piston 52 to provide a seal between the cylinder 50 and the piston 52. Attached to the rear of piston 52 and extending upward therefrom is a shaft 56.

A flange member 58 is attached to the other end of the shaft 56 and a piston 60 is located on the shaft at a position intermediate the piston 52 and the flange 58. The piston 60 is adapted to reciprocate within a piston housing 62. It should be noted that flange 58 is located at the uppermost functional end of the shaft 56 and need not be located at the actual physical end thereof. The configuration of the flange 58 is important only to the extent that it must extend from the shaft 56 and contact switches 64 and 66 during the reciprocal movement of the shaft 56.

Alternatively, photoelectric switches may be employed, if desired, thus eliminating the need for a projecting member on the shaft 56. A pair of photoelectric units may be positioned such that shaft 56 blocks the light path of the lower unit when the shaft moves upwardly from its lowest position and blocks the light path of the upper unit when it reaches the desired upper position.

Leading from the internal conduit 44' of the base member 44 is a line 70 which is connected to an internal conduit 72' of a second base member 72 which is also resting on the support member 46. Extending downward from the base member 72, and through the support member 46 is a filling nozzle 74. A plurality of filling nozzles may be employed to mold one or more foamed articles. The lower end of the nozzle 74 extends to and is flush with a mold cavity defined by a male mold half 76 and a female mold half 78. Mold half 78 is conveniently affixed to the support member 46 and the mold half 76 is supported by a reciprocating bed 77 adapted to provide for easy separation of the mold halves 76 and 78 to facilitate product removal. Slidably mounted in the nozzle 74 and the base member 72 is a rod 80. The upper end of the rod 80 is provided with a piston 82 which reciprocates within a piston housing 84. The housing 84 is provided with a pair of conduits 85 and 86 which are alternately connected to a source of gas under pressure.

The operation of the preferred device shown in FIG. 1 is as follows: A polymer or polymer solution mass is fluxed in an extruder 10. A fluid blowing agent may be admitted under pressure directly into the barrel of the extruder by means of line 12, as desired. The fluxed mass and fluid blowing agent which is passed from the extruder 10 is maintained at a temperature above the glass transition temperature of the mass, and under a pressure substantially above the forming pressure of the blowing agent. "Foaming pressure" is understood to mean that pressure above which the mixture of thermoplastic material and fluid blowing agent is maintained substantially unexpanded (in volume). The extruder 10, which is in continuous communication with an annular zone 17 of the disperser 20 defined by the cylindrical barrel 22 and the rotating shaft 24, continuously extrudes the premixture through line 16 and into the annular zone 17. Fluid blowing agent may alternatively or additionally be introduced separately into the annular zone 17 to be mixed with the gross premixture from the extruder 10. The gross premixture mass is forced through the disperser 20, while the disperser 20 is also maintained at a temperature and pressure above the foaming temperature and pressure of the low viscosity fluid blowing agent. The shaft 24 is rotated by any suitable drive means such as an electric motor, at speeds of from 10 to 1,000 rpms. That shaft may, therefore, be operated at the same speeds as the extruder, or faster as desired.

The disperser 20 may be provided with heating means (not shown) to maintain the mixture in the molten state and thus prevent solidification of the mass therein. Heating of the mixture in the disperser 20 is not required. Heat is applied to the mixture in the extruder 10 and the temperature is maintained in the disperser.

The low viscosity blowing agent dispersed in the mass is grossly broken up when passed through the high shear zone of the first, rapidly-rotating perforated disc. The secondary flow patterns in the low shear mixing zone between the first perforated disc 30 and solid disc forces the mass to migrate to a position at the outer edge of the leading edge of the solid disc 32. The mass is subjected to an intense shear gradient in passing into the intense shear zone wherein the mass cavitates and the blowing agent fills the areas abandoned by this cavitation. The shear gradient is such that the rate at which the mass flows from the mixing region after the first perforated disc to the intense shear region is greater than the characteristic relaxation time of the mass. Further mixing occurs in the low shear mixing zone 35 between the intense shear region and the second perforated disc. The apertures of the second perforated disc advantageously employ the viscoelasticity of the polymer to enhance the mixing characterized by viscoelastic secondary flow patterns, wherein the blowing agent is randomized throughout the mass. This cycle is then repeated when more than one disc dispersion unit is provided in the disperser.

The disperser 20, which is in communication with the expanding accumulation zone 45 defined by the cylinder 50, the piston 52 and the base member 44, continuously conveys the mixture of thermoplastic material and blowing agent through line 42, into the zone 45, and against the piston 52. A surge valve 43 is provided on line 42 to prevent significant pressure drop in disperser 20 during molding operation. As the mixture is fed from the disperser into the zone 45, the piston is forced from its lower-most position to an upper, predetermined position. The lower-most position of the piston 52 is reached when the piston 52 comes in contact with the base member 44. The upward travel of piston 52 and piston 60 is resisted by means of a gas under pressure in the region 51 above the piston 60 in the piston housing 62. In addition, the region 51 in the piston housing 62 is provided with a conduit 63 which is in communication with a source of gas under pressure. As the material from the disperser 20 forces piston 52 upward, and at the same time forces piston 60 upward, the gas in region 51 is compressed. Since the charging of the zone 45 is opposed by the piston 52, the filling of the zone 45 cannot start until the disperser pressure exceeds the back-pressure of the piston. As the piston moves upward, the gas volume in region 51 is decreased and the gas pressure is increased. The disperser pressure must continuously exceed the increasing piston pressure during the expansion of the zone 45. It must be noted that the disperser pressure is maintained by the constant pressure from the extruder which is in continuous communication with the disperser. Alternatively, during the expansion of the zone 45, the pressure of the gas in region 51 can be regulated so that a substantially constant force is applied to the piston 60. In any case, the mixture being charged into the expanding zone 45 must be maintained at a pressure above the foaming pressure thereof. While a pressure of as low as about 500 psi will normally prevent foaming of the mixture, pressure of at least 1,500 psi have been found to give best results.

The piston 52 travels upward until the flange 58, carried by the shaft 56, contacts the switch 66 located at a predetermined position. In a manner well known in the art, the activation of the switch 66 causes gas under pressure to enter piston housing 84 through conduit 85 and produces an upward motion of the piston 82. The lower end of the rod 80 is thereby withdrawn from the nozzle 74 until it reaches a position indicated by the reference numeral 87. Communication between the mold defined by mold halves 76 and 78 and the zone 45 is thus established. As the instant communication is established, the mixture is forced from the accumulation zone 45 into the mold because the pressure within the region 51, which has now become greater than the pressure within the zone 45, causes the downward motion of the piston 52 until it reaches its lower-most position. If necessary, the line 70 and the base member 72 can be provided with heating means, not shown, to prevent solidification of thermoplastic material therein. Normally, however, the short molding cycles used in the present invention eliminate the need for any additional heating.

When the piston 52 reaches its lower-most position, the zone 45 is essentially collapsed and the flange 58 contacts the switch 66, and in a manner well known in the art, gas under pressure is caused to enter the piston housing 84 through conduit 86 thereby producing a downward movement of the piston 82 and the rod 80. At the instant the rod 80 enters the nozzle 74 at the point 73, communication is terminated between the mold and the accumulation zone 45 at a point where the pressure is above the foaming pressure of the mixture. As the rod travels downward, it forces the mixture in the nozzle 74, that is, between the point 73 and the mold, into the mold and the bottom of the rod comes flush with the molded article 79. In this manner, a sprue-free molded article is produced and the formation of an unfoamed slug in the system is prevented. Foamed articles can be molded having either a sprue or a depression simply by adjusting the rod 80. While it is preferred to mold sprue-free articles, the configuration of certain molded articles will be able to tolerate a sprue or a depression. In addition, the apparatus of this invention can be employed to mold solid thermoplastic articles.

From the foregoing description, it is evident that the apparatus of the present invention can be employed to rapidly, efficiently and automatically provide intimate dispersions of low viscosity fluids in high viscosity polymer or polymer solution masses which are employed in the production of formed thermoplastic articles.

It is, however, to be understood that the apparatus of the invention may be employed in conjunction with any process requiring the intimate dispersing of a lower viscosity fluid in a high viscosity polymer or polymer solution mass.

What is claimed is:

1. Apparatus for dispersing a low viscosity fluid throughout a high viscosity polymer-containing mass comprising: conveying means for continuously passing a gross pre-mixture of said high viscosity polymer-containing mass and said lower viscosity fluid in simultaneous co-current flow to and in a single direction through mixer means having a cylindrical barrel and a plurality of spaced, commonly-rotatable dispersion discs positioned therein as alternately-spaced perforated and solid rotating discs; said perforated discs providing first mixing zones through their perforations and having outer edge surfaces in close rotating clearance with the inner walls of said barrel; said solid rotating discs having their outer edge surfaces spaced from the inner walls of said barrel to there form second mixing zones wherein said fluid is mixed after passage through said first mixing zones and is intimately dispersed throughout the polymer-containing mass when passed through said second mixing zones; said plurality of perforated and solid discs being arranged so that the first and last discs are perforated.

2. Apparatus in accordance with claim 1, wherein said plurality of dispersion discs are spaced at least one-half inner barrel radius apart.

3. Apparatus in accordance with claim 1, wherein said conveying means includes inlet means for passing said gross pre-mixture of high viscosity polymer-containing mass and said low viscosity fluid to an outlet means for passing the dispersion thereof from said mixer means.

4. Apparatus in accordance with claim 1, wherein said conveying means also includes mixing means for effecting the gross pre-mixing of said high viscosity polymer-containing mass and said low viscosity fluid prior to passing same to said mixer means.

* * * * *